(12) United States Patent
Kumar et al.

(10) Patent No.: US 9,536,355 B1
(45) Date of Patent: Jan. 3, 2017

(54) THERMAL DETECTION IN AN AUGMENTED REALITY SYSTEM

(71) Applicant: DAQRI, LLC, Los Angeles, CA (US)

(72) Inventors: Rajay Kumar, Huntington Beach, CA (US); Mark Anthony Sararu, Los Angeles, CA (US)

(73) Assignee: DAQRI, LLC, Los Angeles, CA (US)

( * ) Notice: Subject to any disclaimer, the term of this patent is extended or adjusted under 35 U.S.C. 154(b) by 0 days.

(21) Appl. No.: 15/080,414

(22) Filed: Mar. 24, 2016

(51) Int. Cl.
| | | |
|---|---|---|
| G09G 3/04 | (2006.01) | |
| G06T 19/00 | (2011.01) | |
| G01B 21/18 | (2006.01) | |
| G01N 25/00 | (2006.01) | |

(52) U.S. Cl.
CPC ............. G06T 19/006 (2013.01); G01B 21/18 (2013.01); G01N 25/00 (2013.01)

(58) Field of Classification Search
CPC .................................................... G06T 19/006
See application file for complete search history.

(56) References Cited

U.S. PATENT DOCUMENTS

| | | | | |
|---|---|---|---|---|
| 5,745,387 A * | 4/1998 | Corby, Jr. | .............. | B25J 9/1671 348/114 |
| 8,289,372 B2 * | 10/2012 | Hamrelius | ................ | G01J 5/10 250/330 |
| 8,896,628 B2 * | 11/2014 | Suto | .................... | G09G 5/00 345/629 |
| 2006/0216011 A1 * | 9/2006 | Godehn | .................. | G01S 3/046 396/58 |
| 2010/0207024 A1 * | 8/2010 | Thiele | .................... | G03B 17/00 250/330 |
| 2014/0043436 A1 * | 2/2014 | Bell | .................... | H04N 13/0203 348/46 |
| 2014/0253735 A1 * | 9/2014 | Fox | .................... | H04M 1/0254 348/164 |
| 2015/0172545 A1 * | 6/2015 | Szabo | ............... | H04N 5/23238 348/36 |
| 2015/0187144 A1 * | 7/2015 | Roth | .................... | G06T 19/006 345/633 |
| 2015/0302654 A1 * | 10/2015 | Arbouzov | ............. | G06T 19/006 345/633 |
| 2016/0155097 A1 * | 6/2016 | Venkatesha | ............ | G06Q 10/20 702/184 |

* cited by examiner

*Primary Examiner* — Phi Hoang
(74) *Attorney, Agent, or Firm* — Schwegman Lundberg & Woessner, P.A.

(57) ABSTRACT

An augmented reality (AR) device comprises a transparent display, a thermal sensor, a depth sensor, and a processor. The thermal sensor generates thermal data related to physical objects detected by the AR device. A thermal baseline identification engine forms a thermal baseline using data from infrared imaging and depth profiling sensors, thermal data of the physical objects in a mapped 3D space, thermal context of the objects both spatially and based on their operating status, and their thermal parameters. A thermal anomaly identification engine identifies a thermal anomaly based on the established thermal baseline and the real time measurements, and generates a warning notification in response to the identified thermal anomaly.

18 Claims, 9 Drawing Sheets

THERMAL DETECTION IN AN AUGMENTED REALITY SYSTEM

TECHNICAL FIELD

The subject matter disclosed herein generally relates to an augmented reality device. Specifically, the present disclosure addresses systems and methods for detecting a thermal anomaly in a physical environment using an augmented reality system.

BACKGROUND

An augmented reality (AR) device can be used to generate and display data in addition to an image captured with the AR device. For example, AR is a live, direct, or indirect view of a physical, real-world environment whose elements are augmented by computer-generated sensory input such as sound, video, graphics or Global Positioning System (GPS) data. With the help of advanced AR technology (e.g., adding computer vision and object recognition), information about the surrounding real world of the user becomes interactive. Device-generated (e.g., artificial) information about the environment and its objects can be overlaid on the real world.

BRIEF DESCRIPTION OF THE DRAWINGS

Some embodiments are illustrated by way of example and not limitation in the figures of the accompanying drawings.

DETAILED DESCRIPTION

Figure 1A:
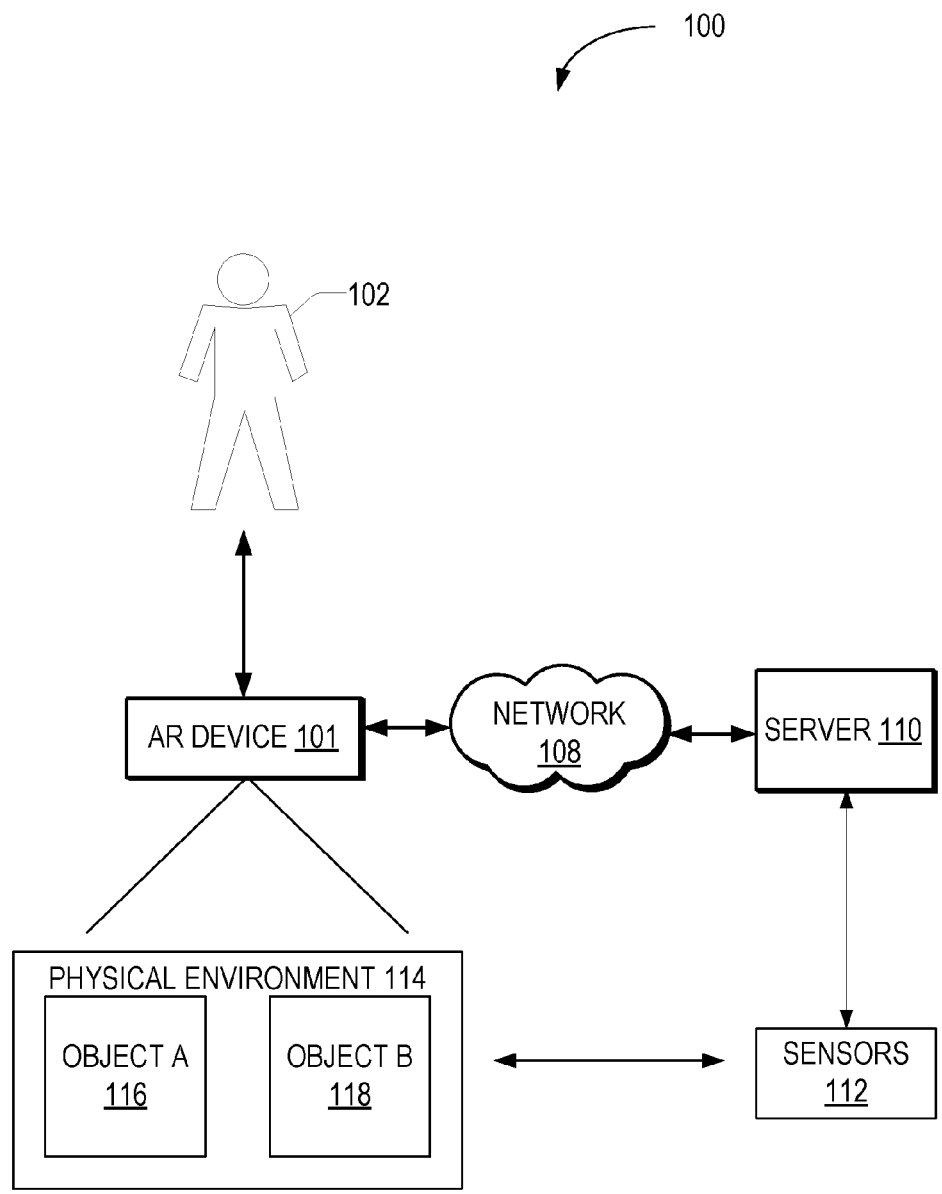
FIG. 1A is a block diagram illustrating an example of a network suitable for a thermal anomaly detection system, according to some example embodiments.

Example methods and systems are directed to a thermal anomaly detection system for an augmented reality (AR) device. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one example embodiment, an AR device includes a wearable device such as a head mounted device (e.g., a helmet, a visor, eyeglasses). The AR device includes a transparent display, sensors, an augmented reality (AR) application, and a thermal anomaly detection engine implemented in one or more processors. The transparent display includes lenses that are disposed in front of a user's eyes (while wearing the helmet or head mounted device) to display AR content (e.g., virtual objects). The AR application renders the AR content for display in the transparent display of the AR device. The sensors generate sensor data. The sensor data may include AR device-based sensor data related the AR device (e.g., a geographic location of the AR device, an orientation and position of the AR device), and ambient-based sensor data related to an ambient environment of the AR device (e.g., ambient temperature, ambient humidity, ambient light, ambient pressure). In one example embodiment, the sensors include a first set of sensors to generate the AR device-based sensor data, and a second set of sensors to generate the ambient-based sensor data. Examples of the first set of sensors include a camera, GPS sensor, an Inertial Measurement Unit (IMU). Examples of the second set of sensors include an audio sensor, a barometer, a humidity sensor, and an ambient light sensor.

Thermal sensors in the AR device generate thermal data related to physical objects detected by the AR device. The thermal anomaly detection engine identifies a thermal anomaly based on a context of the physical objects, the thermal data of the physical objects, and thermal parameters, and generates a warning notification in response to the identified thermal anomaly. The AR application causes a display of AR content comprising identifying the physical object associated with the thermal anomaly in the transparent display.

In one example embodiment, a user wears the AR device. The AR device maps out the space with thermal data when all equipment or machinery is inspected and behaving normally. The AR device can also generate depth data associated with the equipment and machinery. For example, a depth sensor (e.g., an infrared projector and infrared camera) measures the depth of objects in an image captured by the AR device. A server stores the thermal data which is updated whenever any equipment is replaced or moved. On a regular basis, users can wear the AR device while the IR camera and depth sensor records thermal data and depth data in the background. The thermal data can be combined with the depth data to determine the temperature of each component or machine. The AR device compares the thermal and depth data with the recorded baseline data to determine whether a thermal anomaly exists. For example, if the temperature for an area is measured to be significantly higher (e.g., by more than 10 degrees), this data is recorded and sent to a server. This data can then be used for alerts and work ticket generation.

The thermal anomaly detection engine can either receive the thermal parameters from a server or generate the thermal parameters locally on the AR device. The server can generate the thermal parameters based on the context of the physical objects and the thermal data. For example, a user with the AR device walks in a factory room filled with machines. The AR device scans the environment, maps the machines, and determines the thermal data associated with each machine. The thermal data is associated with an operating status of the machines (e.g., functional, no defect). In another example embodiment, the context of the thermal data may be determined based on a series of user activities. For example, the maximum temperature for a component may be $t1_{max}$ after the user operates switch S1, then turns on valve V1. The maximum temperature for the same component may be $t2_{max}$ after the user turns on valve V2 after the user turns on valve V1.

The thermal anomaly detection engine may identify one of the sensor data exceeding one of the preconfigured thresholds specified in the thermal parameters and context of the machines (received from the server or generated locally at the AR device), and generate correction information based on the identified sensor data exceeding one of the thresholds of the thermal parameters. For example, the correction information may include instructions for the user to remedy the thermal anomaly by operating a physical object identified by the AR device and within reach of the user (e.g., a layer of virtual arrows is displayed on top of a physical valve in the transparent display to show the user the direction in which to turn off a valve causing or associated with the thermal anomaly). In another example, the correction information may include instructions for the user to minimize exposure to the thermal anomaly (e.g., a layer of a virtual path of an evacuation route is displayed on top of the physical ground in the transparent display to guide the user to an exit). In another example, the AR content includes instructions (e.g., text) to the user of the AR device and a three-dimensional model to visualize the instructions (e.g., animated virtual character pointing to an exit path).

In another example embodiment, the thermal anomaly detection engine accesses historical thermal data corresponding to user tasks provided by the AR application. Examples of user tasks include operating a particular machine, fixing a component, or maintaining a machine. For example, the AR application provides step by step instructions to the user for operating a machine. At each step, the user tasks are recorded along with the corresponding sensor data resulting from each user task. For example, the AR application may display a virtual arrow above a valve of a machine to indicate the direction in which to rotate the valve. The AR application determines that the user has turned the valve by detecting a change in the position of the valve (either by using sensors connected to the valve or using image recognition to visually determine a different position of a valve). The thermal anomaly detection engine measures sensor data in response to the user turning the valve. For example, the thermal anomaly detection engine measures the temperature of a conduit connected to the valve. After the valve has turned, the AR application displays the next step, such as a virtual button corresponding to a physical button of the machine, and instructs the user to press on the physical button. Once the AR application determines the button has been pressed, the thermal anomaly detection engine measures sensor data in response to the pressed button. For example, the thermal anomaly detection engine measures a temperature of a component associated with the button. Therefore, the historical sensor data includes historical sensor data associated with each step of a user task. For example, the pressure of conduit C may change from pressure p1 to pressure p2 in response to the user turning the valve. Similarly, the temperature of component C may change from temperature t1 to temperature t2 in response to the user pushing button B.

The thermal anomaly detection engine may use the historical thermal data to identify user actions that resulted in a negative outcome. A negative outcome may be defined based on preconfigured parameters for the sensor data. The negative outcome may be identified when one of the sensor data exceeds a predefined safety threshold. For example, the negative outcome is identified when a pressure exceeds a predefined safety threshold temperature for the valve. The thermal anomaly detection engine then identifies the cause of the negative outcome (e.g., user turned the valve).

In another example embodiment, the AR application of the HMD identifies a physical object in an image captured with a camera of the HMD and retrieves a three-dimensional model of a virtual object based on the identified object in the image. The AR application then renders the three-dimensional model of the virtual object in the transparent display. The user perceives the virtual object as an overlay on the real world physical object.

The display of the HMD may be retractable. The position of the display may be adjusted based on an eye level of the user. For example, the display may be positioned in a line of sight of the user of the HMD. The display may include a display lens capable of displaying AR content. The AR device may include a computing device, such as a hardware processor, with the AR application that allows the user wearing the AR device to experience information, such as in the form of a virtual object such as a three-dimensional (3D) virtual object overlaid on an image or a view of a physical object captured with a camera in the AR device. The AR device may include optical sensors. The physical object may include a visual reference (e.g., a recognized image, pattern, or object, or unknown objects) that the AR application can identify using predefined objects or machine vision. A visualization of the additional information (also referred to as AR content), such as the 3D virtual object overlaid or engaged with a view or an image of the physical object, is generated in the display lens of the AR device. The display lens may be transparent to allow the user to see through the display lens. The display lens may be part of a visor or face shield of the AR device or may operate independently from the visor of the AR device. The 3D virtual object may be selected based on the recognized visual reference or captured image of the physical object. A rendering of the visualization of the 3D virtual object may be based on a position of the display relative to the visual reference. Other AR applications allow the user to experience visualization of the additional information overlaid on top of a view or an image of any object in the real physical world. The virtual object may include a 3D virtual object and/or a two-dimensional (2D) virtual object. For example, the 3D virtual object may include a 3D view of an engine part or an animation. The 2D virtual object may include a 2D view of a dialog box, menu, or written information such as statistics information for properties or physical characteristics of the corresponding physical object (e.g., temperature, mass, velocity, tension, stress). The AR content (e.g., image of the virtual object, virtual menu) may be rendered at the AR device or at a server in communication with the AR device. In one example embodiment, the user of the AR device may navigate the AR content using audio and visual inputs captured at the AR device or other inputs from other devices, such as a wearable device. For example, the display lenses may extend or retract based on a voice command of the user, a gesture of the user, a position of a watch in communication with the AR device.

In another example embodiment, a non-transitory machine-readable storage device may store a set of instructions that, when executed by at least one processor, causes the at least one processor to perform the method or operations discussed within the present disclosure.

FIG. 1A is a network diagram illustrating a network environment 100 suitable for operating an AR application of an AR device with display lenses, according to some example embodiments. The network environment 100 includes an AR device 101 and a server 110, communicatively coupled to each other via a network 108. The AR device 101 and the server 110 may each be implemented in a computer system, in whole or in part, as described below with respect to FIG. 10.

The server 110 may be part of a network-based system. For example, the network-based system may be or include a cloud-based server system that provides AR content (e.g., audio or visual instructions on how to operate a tool, information about a thermal anomaly, instructions on how to remedy the thermal anomaly, visualization of the thermal anomaly, augmented information including 3D models of virtual objects related to physical objects in images captured by the AR device 101) to the AR device 101.

The AR device 101 may include a helmet or other head mounted devices that a user 102 may wear to view the AR content related to captured images of several physical objects (e.g., object A 116, object B 118) in a real world physical environment 114. In one example embodiment, the AR device 101 includes a computing device with a camera and a display (e.g., smart glasses, smart helmet, smart visor, smart face shield). The computing device may be removably mounted to the head of the user 102. In one example, the display may be a screen that displays what is captured with a camera of the AR device 101. In another example, the display of the AR device 101 may include a transparent display or see-through display, such as in the visor or face shield of a helmet, or a display lens distinct from the visor or face shield of the helmet.

The user 102 may be a user of an AR application in the AR device 101 and at the server 110. The user 102 may be a human user (e.g., a human being), a machine user (e.g., a computer configured by a software program to interact with the AR device 101), or any suitable combination thereof (e.g., a human assisted by a machine or a machine supervised by a human). The user 102 is not part of the network environment 100, but is associated with the AR device 101.

In one example embodiment, the AR application determines the AR content to be rendered and displayed in the display of the AR device 101 based on sensor data related to the AR device 101, sensor data related to the user 102, sensor data related to the physical objects 116, 118, and sensor data related to an ambient environment of the AR device 101. The sensor data related to the AR device 101 may also be referred to as AR device-based sensor data. The sensor data related to the user 102 may also be referred to as user-based sensor data. The sensor data related to the physical objects 116, 118 in the physical environment 114 in which the AR device 101 is located may also be referred to as physical object-based sensor data. The sensor data related to the ambient environment of the AR device 101 may also be referred to as ambient-based sensor data. The AR device-based sensor data may include a geographic location, a position, an orientation of the AR device 101 by using, for example, a GPS sensor and an IMU sensor in the AR device 101. The user-based sensor data may include a heart rate, a blood pressure, brain activity, and biometric data related to the user 102 by using, for example, a heart rate sensor and an EEG sensor in the AR device 101. The physical object-based sensor data may include an image of the physical objects 116, 118, a temperature of the physical objects 116, 118 by using, for example, a camera and an infrared sensor in the AR device 101. The ambient-based sensor data may include an ambient pressure, an ambient humidity level, an ambient light level, and an ambient noise level by using, for example, a barometer, a humidity sensor, a light sensor, or a microphone in the AR device 101.

The AR device 101 may detect and identify a thermal anomaly based on the combination of AR device-based sensor data, user-based sensor data, physical object-based sensor data, and ambient-based sensor data. In one example embodiment, the AR device 101 receives preconfigured parameters (e.g., safe thermal ranges, and safe thresholds for corresponding sensors) associated with a machine or operating status of a machine and performs the analysis locally on the AR device 101 by comparing the sensor-based data with the preconfigured parameters and the context. If the AR device 101 determines that one or more of the sensor data matches one or more of the preconfigured parameters, the AR device 101 notifies the user 102 by generating an audio or visual alert in the AR device 101. The AR device 101 may further provide the user 102 with instructions on how to remedy or correct an operation on the physical objects 116, 118 to rectify the thermal anomaly. If AR device 101 determines that no action from the user 102 can rectify the thermal anomaly, the AR device 101 may cause a display of a virtual evacuation route or path in the transparent display of the AR device 101.

In another example embodiment, the AR device 101 streams or provides sensor-data to the server 110 so that the server 110 performs a thermal anomaly analysis. For example, the server 110 may already be configured with preconfigured parameters associated with context, operating conditions, and user tasks. For example, the temperature of a gauge may not exceed a threshold after the user 102 turns a valve in step 3 of a maintenance operation of a machine.

Furthermore, external sensors 112 may be associated with, coupled to, or related to the objects 116 and 118 in the physical environment 114 to measure a location, information, or captured readings from the objects 116 and 118. Examples of captured readings may include but are not limited to weight, pressure, temperature, velocity, direction, position, intrinsic and extrinsic properties, acceleration, and dimensions. For example, the sensors 112 may be disposed throughout a factory floor to measure movement, pressure, orientation, and temperature. The server 110 can compute readings from data generated by the sensors 112.

The sensors 112 may include other sensors used to track the location, movement, and orientation of the AR device 101 externally without having to rely on the sensors 112 internal to the AR device 101. The sensors 112 may include optical sensors (e.g., depth-enabled 3D camera), wireless sensors (Bluetooth, Wi-Fi), GPS sensor, and audio sensors to determine the location of the user 102 wearing the AR device 101, distance of the user 102 to the tracking sensors 112 in the physical environment 114 (e.g., sensors 112 placed in corners of a venue or a room), the orientation of the AR device 101 to track what the user 102 is looking at (e.g., the direction in which the AR device 101 is pointed, e.g., AR device 101 pointed towards a player on a tennis court, AR device 101 pointed at a person in a room, etc.).

The server 110 may perform a thermal anomaly analysis based on data from the sensors 112 and internal sensors in the AR device 101. Alternatively, the AR device 101 may receive sensor data from sensors 112 and perform the thermal anomaly analysis locally on the AR device 101.

In another embodiment, data from the sensors 112 and internal sensors in the AR device 101 may be used for analytics data processing at the server 110 (or another server) for analysis on usage and how the user 102 is interacting with the physical environment 114. Live data from other servers 110 may also be used in the analytics data processing. For example, the analytics data may track at what locations (e.g., points or features) on the physical or virtual object the user 102 has looked, how long the user 102 has looked at each location on the physical or virtual object, how the user 102 moved with the AR device 101 when looking at the physical or virtual object, which features of the virtual object the user 102 interacted with (e.g., such as whether a user 102 tapped on a link in the virtual object), and any suitable combination thereof. The AR device 101 receives a visualization content dataset related to the analytics data. The AR device 101 then generates a virtual object with additional or visualization features, or AR content, based on the visualization content dataset.

In another example embodiment, the server 110 collects sensor data from one or more AR device 101. The server 110 may determine and identify a thermal anomaly based on the combined sensor data from all AR devices 101. For example, a first AR device 101 is located at a first location of a factory plant. A second AR device 101 is located at a second location, proximate to the first location, of the factory plant. The server 110 receives sensor data from both the first AR device 101 at the first location and the second AR device 101 at the second location. The sensor data indicates that an engine is overheating at the first location and that the pressure in a valve exceeds a safe pressure level at the second location. The server 110 identifies a thermal anomaly (e.g., the combination of unsafe temperature of the engine and unsafe pressure of the valve may cause both to explode). Once the server 110 has identified the thermal anomaly, the server 110 can generate instructions to the first AR device 101, the second AR device 101, or both AR devices 101. For example, the server 110 may generate instructions only to the second AR device 101 if the server 110 determines that shutting off the valve at the second location will reduce the temperature of the engine at the first location. In another example, the server 110 may generate a first instruction to the first AR device 101 to turn off the engine, and a second instruction to the second AR device 101 to turn on the valve by a quarter turn.

In another example embodiment, the AR application may provide the user 102 with a display of AR content triggered by identified objects in the physical environment 114. The physical environment 114 may include identifiable objects such as a 2D physical object (e.g., a picture), a 3D physical object (e.g., a factory machine), a location (e.g., at the bottom floor of a factory), or any references (e.g., perceived corners of walls or furniture) in the real world physical environment 114. The AR application may include computer vision recognition to determine corners, objects, lines, and letters. The user 102 may point a camera of the AR device 101 to capture an image of the objects 116 and 118 in the physical environment 114.

In one example embodiment, the objects 116, 118 in the image are tracked and recognized locally in the AR device 101 using a local context recognition dataset or any other previously stored dataset of the AR application of the AR device 101. The local context recognition dataset module may include a library of virtual objects associated with real-world physical objects 116, 118 or references. In one example, the AR device 101 identifies feature points in an image of the objects 116, 118 to determine different planes (e.g., edges, corners, surfaces, dials, letters). The AR device 101 may also identify tracking data related to the objects 116, 118 (e.g., GPS location of the AR device 101, orientation, distances to objects 116, 118). If the captured image is not recognized locally at the AR device 101, the AR device 101 can download additional information (e.g., 3D model or other augmented data) corresponding to the captured image, from a database of the server 110 over the network 108.

In another embodiment, the objects 116, 118 in the image are tracked and recognized remotely at the server 110 using a remote context recognition dataset or any other previously stored dataset of an AR application in the server 110. The remote context recognition dataset module may include a library of virtual objects or augmented information associated with real-world physical objects 116, 118 or references.

Any of the machines, databases, or devices shown in FIG. 1A may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1A may be combined into a single machine, and the functions described herein for any single machine, database, or device may be subdivided among multiple machines, databases, or devices.

The network 108 may be any network that enables communication between or among machines (e.g., the server 110), databases, and devices (e.g., AR device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 1B:
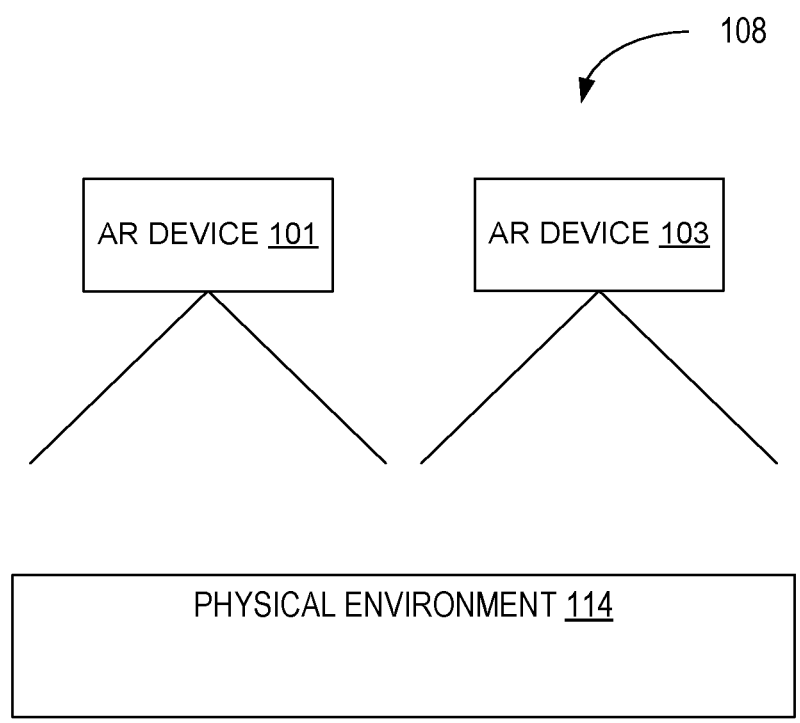
FIG. 1B is a block diagram illustrating an example of a network suitable for forming a thermal baseline to a three-dimensional mapped space, according to some example embodiments.

FIG. 1B is a block diagram illustrating an example of a network suitable for forming a thermal baseline to a three-dimensional mapped space, according to some example embodiments. One or more AR devices (a first AR device 101 and a second AR device 103) may scan and map, at the same or different times, the same physical environment 114 to determine the temperature of each component or machine inside the physical environment 114.

Figure 2:
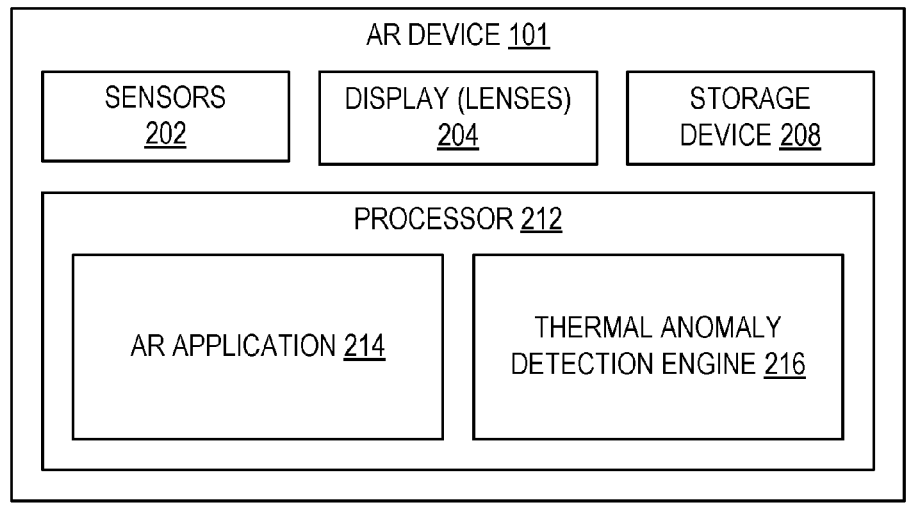
FIG. 2 is a block diagram illustrating an example embodiment of a wearable device.

FIG. 2 is a block diagram illustrating modules (e.g., components) of the AR device 101, according to some example embodiments. The AR device 101 may be a helmet that includes sensors 202, a display 204, a storage device 208, and a processor 212. The AR device 101 may not be limited to a helmet and may include any type of mobile device, such as a hat, or a visor.

The sensors 202 may be used to generate internal tracking data of the AR device 101 to determine a geographic location, a position, and an orientation of the AR device 101. The geographic location may be determined by using, for example, a GPS device. The position and the orientation of the AR device 101 may be used to determine a field of view of the user 102. For example, the direction in which the user 102 is looking may be determined based on the position and orientation of the AR device 101 worn by the user 102. Therefore, the sensors 202 may be used to determine whether the AR device 101 is oriented towards a real world object (e.g., when the user 102 looks at object 116) or in a particular direction (e.g., when the user 102 tilts his head to watch his wrist). Furthermore, sensors 202 may be used to identify real world objects in a field of view of the AR device 101. For example, a virtual object may be rendered and displayed in the display 204 when the sensors 202 indicate that the AR device 101 is oriented towards an object 116. The virtual object may be based on a combination of sensor data from the sensors 202. As previously described, sensors 202 may also be used to generate sensor data including AR device-based sensor data, user-based sensor data, ambient-based sensor data, and user-based sensor data.

Figure 3:
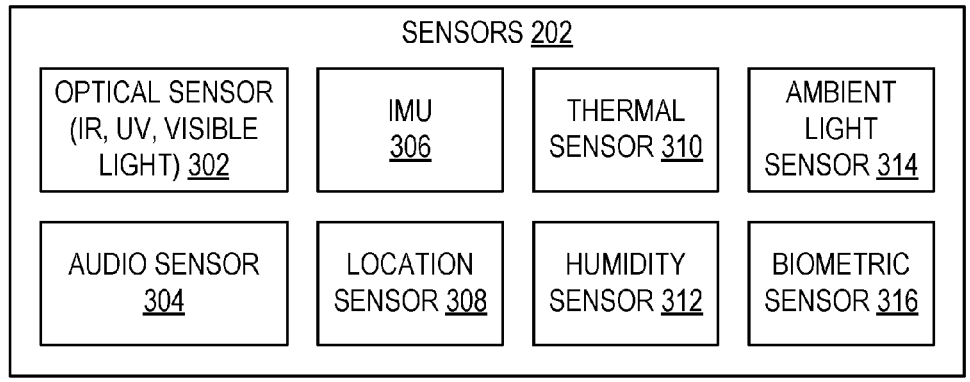
FIG. 3 is a block diagram illustrating examples of sensors.

FIG. 3 is a block diagram illustrating examples of sensors. For example, the sensors 202 may include a camera (or optical sensor) 302, an audio sensor 304, an IMU sensor 306, a location sensor 308, a thermal sensor 310, a humidity sensor 312, an ambient light sensor 314, and a biometric sensor 316. It is noted that the sensors 202 described herein are for illustration purposes. Sensors 202 are thus not limited to the ones described.

The camera 302 includes an optical sensor(s) (e.g., a camera) that may encompass different spectra. The camera 302 may include one or more external cameras aimed outside the AR device 101. For example, the external camera may include an infrared camera (IR) or a visible camera. The external cameras may include rear facing cameras and front facing cameras disposed in the AR device 101. The front facing cameras may be used to capture a front field of view of the AR device 101 while the rear facing cameras may be used to capture a rear field of view of the AR device 101. The pictures captured with the front and rear facing cameras may be combined to recreate a 360-degree view of the physical world around the AR device 101.

The camera 302 may include one or more internal cameras aimed at the user 102. The internal cameras may include an infrared (IR) camera configured to capture an image of a retina of the user 102. The IR camera may be used to perform a retinal scan to map unique patterns of the retina of the user 102. Blood vessels within the retina absorb light more readily than the surrounding tissue in the retina and therefore can be identified with IR imaging. This IR image of the user's eye blood vessels and their variation patterns may be used as a biometric data unique to the user 102, or to monitor the user's focus or activeness level when combined with other biometric sensor data. One example to realize this functionality would be utilizing an IR projector to cast a beam of IR light into the user's eye as the user 102 looks through the display 204 (e.g., lenses) towards virtual objects rendered in the display 204. The beam of IR light traces a path on the retina of the user 102. Because retinal blood vessels absorb more of the IR light than the rest of the eye, the amount of reflection varies during the retinal scan. This active detection scheme may enhance the accuracy of the pattern recognition and update of the user 102's eye blood vessels.

In another example embodiment, the internal camera may include an ocular camera configured to capture an image of an iris in the eye of the user 102. In response to the amount of light entering the eye, muscles attached to the iris expand or contract the aperture at the center of the iris, known as the pupil. The expansion and contraction of the pupil depends on the amount of ambient light. The ocular camera may use iris recognition as a method for biometric identification. The complex pattern on the iris of the eye of the user 102 is unique and can be used to identify the user 102. The ocular camera may cast infrared light to acquire images of detailed structures of the iris of the eye of the user 102. Biometric algorithms may be applied to the image of the detailed structures of the iris to identify the user 102.

In another example embodiment, the ocular camera includes an IR pupil dimension sensor that is pointed at an eye of the user 102 to measure the size of the pupil of the user 102. The IR pupil dimension sensor may sample the size of the pupil (e.g., using an IR camera) on a periodic basis or based on predefined triggered events (e.g., user 102 walks into a different room, sudden changes in the ambient light, or the like).

The audio sensor 304 may include a microphone. For example, the microphone may be used to record a voice command from the user 102 of the AR device 101. In other examples, the microphone may be used to measure ambient noise level to measure the intensity of the background noise. In another example, the microphone may be used to capture ambient noise. Analytics may be applied to the captured ambient noise to identify specific types of noises such as explosions or gunshot noises.

The IMU 306 may include a gyroscope and an inertial motion sensor to determine an orientation and movement of the AR device 101. For example, the IMU 306 may measure the velocity, orientation, and gravitational forces on the AR device 101. The IMU 306 may also detect a rate of acceleration using an accelerometer and changes in angular rotation using a gyroscope.

The location sensor 308 may determine a geolocation of the AR device 101 using a variety of techniques such as near field communication, GPS, Bluetooth, Wi-Fi. For example, the location sensor 308 may generate geographic coordinates of the AR device 101.

The thermal sensor 310 may measure an ambient temperature of the AR device 101.

The humidity sensor 312 may determine a relative humidity level ambient to the AR device 101. For example, the humidity sensor 312 determines the humidity level of a room in which the AR device 101 is located.

The ambient light sensor 314 may determine an ambient light intensity around the AR device 101. For example, the ambient light sensor 314 measures the ambient light in a room in which the AR device 101 is located.

The biometric sensor 316 includes sensors configured to measure biometric data unique to the user 102 of the AR device 101. In one example embodiment, the biometric sensors 316 include an ocular camera, an EEG (electroencephalogram) sensor, and an ECG (electrocardiogram) sensor. It is noted that the biometric sensors 316 described herein are for illustration purposes. Biometric sensors 316 are thus not limited to the ones described.

An EEG sensor (e.g., biometric sensor 316) includes, for example, electrodes that, when in contact with the skin of the head of the user 102, measure electrical activity of the brain of the user 102. The EEG sensor may also measure the electrical activity and wave patterns through different bands of frequency (e.g., Delta, Theta, Alpha, Beta, Gamma, Mu). EEG signals may be used to authenticate a user 102 based on fluctuation patterns unique to the user 102.

The ECG sensor (e.g., biometric sensor 316) includes, for example, electrodes that measure a heart rate of the user 102. In particular, the ECG sensor may monitor and measure the cardiac rhythm of the user 102. A biometric algorithm is applied to the user 102 to identify and authenticate the user 102. In one example embodiment, the EEG sensor and ECG sensor may be combined into a same set of electrodes to measure both brain electrical activity and heart rate. The set of electrodes may be disposed around the helmet so that the set of electrodes comes into contact with the skin of the user 102 when the user 102 wears the AR device 101.

Referring back to FIG. 2, the display 204 may include a display (e.g., display surface, lens) capable of displaying AR content (e.g., images, video) generated by the processor 212. The display 204 may be transparent so that the user 102 can see through the display 204 (e.g., such as in a head-up display).

The storage device 208 stores a library of AR content. The AR content may be associated with a specific user task. For example, a user task may be assembling a component. The AR content associated with the task may display virtual objects to show how to assemble the component step by step. The AR content may be associated with the user 102 (e.g., a technician level 2 may have access to AR content related to the technician's duties and responsibilities). The AR content may be downloaded from the server 110 based on an authentication of the user 102 with the AR device 101. The AR content may include two or three dimensional models of virtual objects with corresponding audio. In other examples, the AR content may include an AR application that includes interactive features such as displaying additional data (e.g., location of sprinklers) in response to the user input (e.g., user 102 says "show me the locations of the sprinklers" while looking at an AR overlay showing location of the exit doors). AR applications may have their own different functionalities and operations. Therefore, each AR application may operate distinctly from other AR applications.

The storage device 208 may also store sensor data from sensors 202, and thermal parameters. The sensor data may be associated with the user 102 and the AR device 101. For example, the storage device 208 may store AR device-based sensor data, user-based sensor data, physical object-based sensor data, and ambient-based sensor data. The thermal anomaly may be based on thermal thresholds for a combination of the sensor data (also referred to as thermal context). For example, thermal parameters may include temperature thresholds associated with a user task (e.g., user 102 turns on a valve). The thermal parameters may be based on historical sensor data or preconfigured ranges, parameters, or attributes for one or more sensors 202. In one example embodiment, the AR device 101 downloads the thermal parameters from the server 110.

An example of preconfigured ranges (or context) may include preconfigured ranges for ambient-based sensor data associated with a user task or step of an AR content or application. For example, the ambient-based sensor data may identify a predefined location, a humidity level range, a temperature range for the corresponding AR content. Therefore, thermal baselines may be identified when the AR device 101 is located at the predefined location, when the AR device 101 detects a humidity level within the humidity level range, and when the AR device 101 detects a temperature within the temperature range.

The storage device 208 may also store a database of identifiers of wearable devices capable of communicating with the AR device 101. In another embodiment, the database may also identify reference objects (visual references or images of objects) and corresponding AR contents (e.g., 3D virtual objects, interactive features of the 3D virtual objects). The database may include a primary content dataset, a contextual content dataset, and a visualization content dataset. The primary content dataset includes, for example, a first set of images and corresponding AR contents (e.g., interaction with 3D virtual object models). For example, an image may be associated with one or more virtual object models. The primary content dataset may include a core set of images or the most popular images determined by the server 110. The core set of images may include a limited number of images identified by the server 110. For example, the core set of images may include the images depicting covers of the ten most viewed devices and their corresponding AR contents (e.g., virtual objects that represent the ten most viewed sensing devices in a factory floor). In another example, the server 110 may generate the first set of images based on the most often scanned images received at the server 110. Thus, the primary content dataset does not depend on the objects 116, 118 or images scanned by the AR device 101.

The contextual content dataset includes, for example, a second set of images and corresponding AR contents (e.g., three-dimensional virtual object models) retrieved from the server 110. For example, images captured with the AR device 101 that are not recognized (e.g., by the server 110) in the primary content dataset are submitted to the server 110 for recognition. If the captured image is recognized by the server 110, a corresponding experience may be downloaded at the AR device 101 and stored in the contextual content dataset. Thus, the contextual content dataset relies on the contexts in which the AR device 101 has been used. As such, the contextual content dataset depends on objects or images scanned by the AR application 214 of the AR device 101.

In one example embodiment, the AR device 101 may communicate over the network 108 with the server 110 to access a database of ambient-based context, user-based content context, reference objects, and corresponding AR content at the server 110 to compare the ambient-based sensor data with attributes from the ambient-based context, and the ambient-based sensor data with attributes from the user-based context. The AR device 101 may also communicate with the server 110 to authenticate the user 102. In another example embodiment, the AR device 101 retrieves a portion of a database of visual references, corresponding 3D virtual objects, and corresponding interactive features of the 3D virtual objects.

The processor 212 may include an AR application 214 and a thermal anomaly detection engine 216. The AR application 214 generates a display of information related to the objects 116, 118. In one example embodiment, the AR application 214 generates a visualization of information related to the objects 116, 118 when the AR device 101 captures an image of the objects 116, 118 and recognizes the objects 116, 118 or when the AR device 101 is in proximity to the objects 116, 118. For example, the AR application 214 generates a display of a holographic or virtual menu visually perceived as a layer on the objects 116, 118.

The AR application 214 may display instructions or virtual objects demonstrating how to operate the physical object 116. The virtual objects may include three-dimensional objects that appear as a layer on top of the physical object 116. In one example embodiment, the three-dimensional objects may be scaled and positioned on corresponding parts of the physical object 116 so that the three-dimensional objects appear to be part of the physical object 116.

The AR application 214 may cause the display 204 to display an alert or a notification of a thermal anomaly. The notification may identify the thermal anomaly and include instructions for the user 102 to address the thermal anomaly. For example, the notification may alert the user 102 that an engine is overheating, and to turn off a valve and push a particular switch. The notification may be implemented as AR content (e.g., red color flashes on top of the button to indicate which button to press, virtual arrows may show the direction in which to turn the valve). In another example, the AR device 101 notifies another AR device in a same factory so that another user may assist in rectifying the thermal anomaly. Another user in the same factory may be a similarly skilled technician that can intervene remotely by turning off a master switch or can communicate with the user 102 to provide further assistance and guidance (e.g., via voice or video communication). In another example, the alert may include evacuation instructions for the user 102 if the thermal anomaly cannot be corrected. Virtual arrows may be displayed on the floor of a factory to show an exit path and guide the user 102 to the exit.

The thermal anomaly detection engine 216 may learn and generate a thermal baseline based on sensor data from sensors 202. The thermal anomaly detection engine 216 can identify a series of actions taken by the user 102 leading to a thermal anomaly (e.g., engine temperature exceeding a safety temperature threshold). The thermal anomaly includes an identification of user actions such that when the user 102 later repeats the same series of user actions, the thermal anomaly detection engine 216 generates an alert that an engine may overheat before the engine actually overheats.

Furthermore, the thermal anomaly detection engine 216 may identify and determine a thermal anomaly based on sensor data from sensors 202 and the task of the user 102 (e.g., maintenance of an engine). The thermal anomaly detection engine 216 monitors the sensor data and compares the sensor data to the thermal parameters stored in storage device 208. For example, the thermal anomaly detection engine 216 determines whether the sensor data meet a combination of preconfigured parameters of the thermal anomaly (e.g., engine temperature $t_1$ exceeds safety temperature threshold $t_s$ after turning valve $v_1$ and pressing switch $S_1$), and identifies the corresponding thermal anomaly (e.g., engine overheat). The thermal anomaly detection engine 216 communicates AR content to the AR application 214 to display an alert and instructions to remedy the thermal anomaly (e.g., virtual arrow pointing to a button for the user 102 to push).

Figure 4:
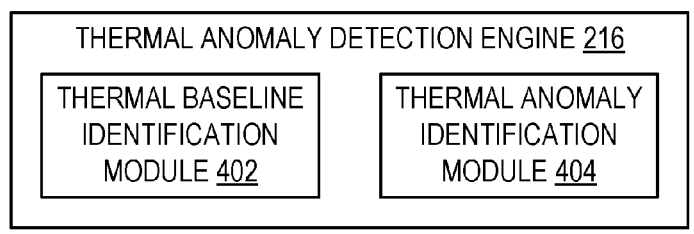
FIG. 4 is a block diagram illustrating an example embodiment of a thermal anomaly detection engine.

FIG. 4 is a block diagram illustrating an example embodiment of the thermal anomaly detection engine 216. The thermal anomaly detection engine 216 is shown by way of example to include a thermal baseline identification module 402 and a thermal anomaly identification module 404. The thermal baseline identification module 402 generates thermal parameters for the thermal anomaly identification module 404 to recognize based on sensor data. For example, the thermal baseline identification module 402 may access preconfigured parameters for the sensor data in storage device 208 to generate a thermal anomaly pattern. For example, for a user task of repairing an engine, components c1, c2, c3 should be present, and the temperature of the engine should be between t1 and t2 after step 6 of the repair instructions. The thermal anomaly pattern may thus include:
Present component after step 6: components c1, c2, c3
Acceptable engine temperature after step 6: t1 to t2

Therefore, a thermal anomaly is detected if component c2 is missing or engine temperature is outside the range t1-t2 after step 6. Other examples of preconfigured parameters include ambient pressure ranges, user temperature ranges, humidity ranges, brightness ranges. Another example of a thermal anomaly pattern includes ranges for each sensor corresponding to each user task in a series of user tasks. For example, humidity level should be between h1 and h2 at steps 3 of a series of user tasks and the heart rate of the user 102 should be between h1 and h2 during the entire series of user tasks. The thermal anomaly pattern may be stored locally in the storage device 208 or remotely on server 110.

In another example embodiment, the thermal baseline identification module 402 accesses historical activities of user 102 when performing a task with the AR application 214. For example, the AR application 214 may display a repair task as a series of steps (e.g., display a first step showing virtual arrow to flip a switch, detect that the user 102 has operated the first step by flipping the switch, display a second step showing a blink color on a button, detect that the user 102 has pressed the button). Sensor data is recorded for each user activity. The historical activities include user activities and corresponding sensor data resulting after each user action. The thermal baseline identification module 402 identifies user actions that have resulted in a negative outcome by detecting that a combination of the sensor data has fallen out of safety range. For example, the thermal baseline identification module 402 identifies that user 102 has turned a dial up right before an engine overheats. Therefore, the thermal baseline identification module 402 generates the thermal anomaly pattern based on user actions that have resulted in a negative outcome. In another example, the thermal baseline identification module 402 identifies user actions that have led to an engine overheating and compiles a list of user actions for the thermal anomaly pattern. For example, a user 102 has previously flipped switch s1 right before the engine overheats. At another time, the user 102 has pressed button b1 right before the engine overheats. Thus, the thermal baseline identification module 402 includes flipping switch s1 and pressing button b1 in the thermal anomaly pattern. Similarly, the thermal anomaly pattern may be stored locally in the storage device 208 or remotely on server 110.

In another example embodiment, the thermal baseline identification module 402 generates the thermal anomaly pattern based on other users' actions that have resulted in a negative outcome (e.g., engine overheat, high pressure). The thermal baseline identification module 402 may receive sensor data from other AR devices 101 and corresponding user actions. The thermal baseline identification module 402 may filter all user activities that have led to negative outcomes and generate thermal anomaly patterns based on the filtered user activities using the sensor data and the corresponding task of the AR application 214 (e.g., an AR application 214 for showing how to build a component). In another example embodiment, the thermal baseline identification module 402 communicates the sensor data and user activities to the server 110. The server 110 receives collective sensor data from all AR devices 101 connected to the server 110. The server 110 can then filter all user activities that have led to negative outcomes using the sensor data and generate thermal anomaly patterns based on the filtered user activities and the corresponding task of the AR application 214 in each AR device 101.

The thermal anomaly identification module 404 receives sensor data (thermal data) from sensors 202 and accesses the thermal parameters from storage device 208. The thermal anomaly identification module 404 compares the sensor data to the thermal parameters based on a context of the physical environment 114. For example, the thermal parameters may include temperature thresholds. Thus, the thermal anomaly identification module 404 may compare thermal data to a temperature threshold for each component or machine to identify a thermal anomaly. For example, if the thermal data of a machine exceeds a safe thermal threshold, the thermal anomaly identification module 404 generates a warning notification to the user 102 or causes the AR application 214 to generate the warning notification.

In another example embodiment, the thermal anomaly identification module 404 generates a suggested course of action for the user 102 to take to correct the thermal anomaly. The suggested course of action may be based on historical user activities and corresponding historical sensor data. Therefore, if a user 102 has turned on valve v1, the thermal anomaly identification module 404 may suggest the user 102 turn off valve v1 since turning on valve v1 during step x of a series of user actions has typically resulted in an engine overheating. The thermal anomaly identification module 404 may communicate the suggested course of action or corrective measure to the AR application 214 to display virtual guides (e.g., arrows) in the display 204. If the thermal anomaly identification module 404 determines that no user actions can correct the thermal anomaly, the thermal anomaly identification module 404 may suggest an evacuation route to the user 102. The thermal anomaly identification module 404 may also broadcast a warning notification to other users in the same location (e.g., factory plant).

Any one or more of the modules described herein may be implemented using hardware (e.g., a processor 212 of a machine) or a combination of hardware and software. For example, any module described herein may configure a processor 212 to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 5:
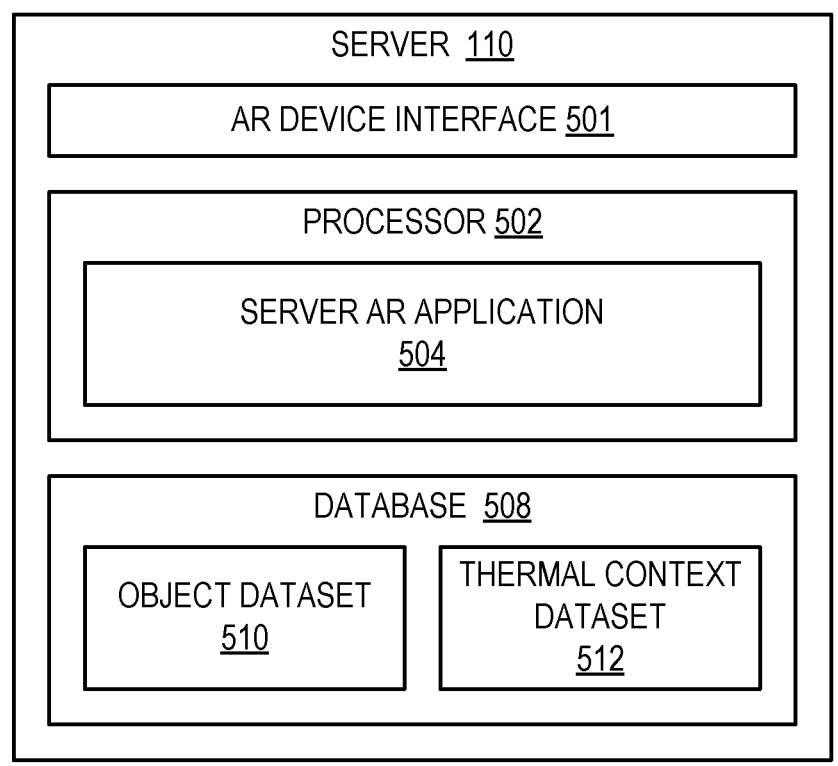
FIG. 5 is a block diagram illustrating an example embodiment of a server.

FIG. 5 is a block diagram illustrating modules (e.g., components) of the server 110. The server 110 includes an AR device interface 501, a processor 502, and a database 508. The AR device interface 501 communicates with the AR device 101 and sensors 112 (FIG. 1) to receive real-time data.

The processor 502 includes a server AR application 504. The server AR application 504 identifies real world physical objects 116, 118 based on a picture or image frame received from the AR device 101. In another example, the AR device 101 has already identified objects 116, 118 and provides the identification information to the server AR application 504. In another example embodiment, the server AR application 504 determines the physical characteristics associated with the real world physical objects 116, 118. For example, if the real world physical object 116 is a gauge, the physical characteristics may include functions associated with the gauge, location of the gauge, reading of the gauge, other devices connected to the gauge, safety thresholds or parameters for the gauge. AR content may be generated based on the real world physical object 116 identified and a status of the real world physical object 116.

The server AR application 504 generate thermal parameters based on the sensor data from AR device 101, the context of the physical objects 116, 118, and based on historical user activities that have resulted in negative outcomes (e.g., overheating). In one example embodiment, the server AR application 504 receives thermal parameters for sensor data for the AR device 101 based on the user task. For example, the temperature of an engine should be between t1 and t2 during step x of a repair operation provided by the AR application 214 or the server AR application 504. The server AR application 504 generates the thermal parameters based on the sensor data and the user task.

In another example embodiment, the server AR application 504 filters historical user activities from all AR devices 101 to determine user activities and corresponding sensor data that have resulted in negative outcomes. The server AR application 504 then generates thermal parameters pattern based on the filtered historical user activities from all AR devices 101 and corresponding sensor data that have resulted in negative outcomes.

The server AR application 504 may provide the thermal parameters to identify a thermal anomaly to the AR device 101 based on the task of the user 102 of the AR device 101 or the identity of the user 102. For example, the server AR application 504 provides thermal parameters for a thermal anomaly for the maintenance of a particular machine to the user 102 of the AR device 101 performing the maintenance of the particular machine. In another example, the server AR application 504 provides thermal parameters based on a context: a task application launched within the AR application 214 (e.g., user 102 launches an AR application 214 to guide the user 102 on how to operate a machine), a task of the user 102 (e.g., user 102 fixing a machine), the position of the user 102 (e.g., supervisor, maintenance worker), the geographic location of the user 102 (e.g., factory building, geofence area), or a combination thereof.

The database 508 may store an object dataset 510 and a thermal context dataset 512. The object dataset 510 may include a primary content dataset and a contextual content dataset. The primary content dataset comprises a first set of images and corresponding virtual object models. The contextual content dataset may include a second set of images and corresponding virtual object models. The thermal context dataset 512 includes a library of thermal parameters for each context, physical object function identification, operating parameters for each physical object, AR application 214, user task information, and user credentials.

Figure 6:
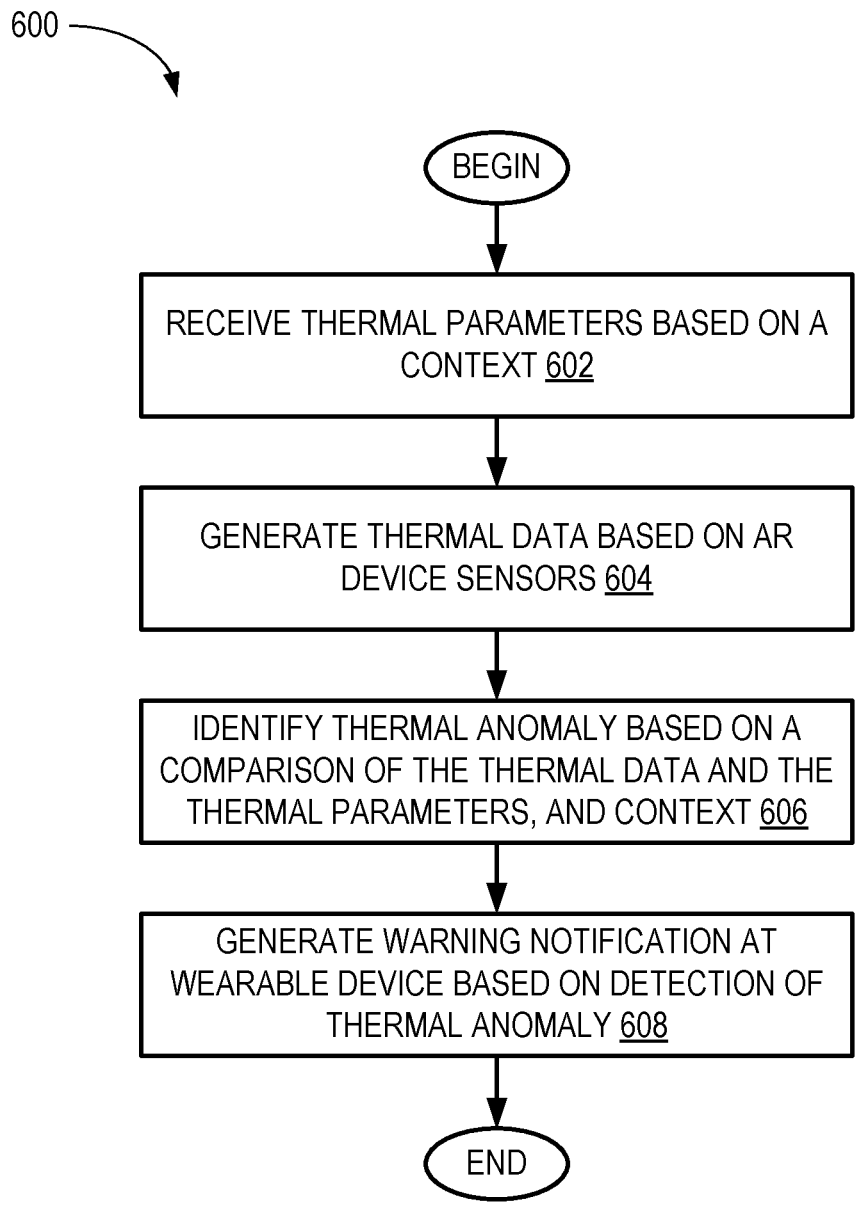
FIG. 6 is a flowchart illustrating a method for identifying thermal anomalies and generating warning notifications at a wearable device, according to an example embodiment.

FIG. 6 is a flowchart illustrating a method 600 for identifying thermal anomalies and generating warning notifications at a wearable device, according to an example embodiment. The method 600 may be deployed on the server 110 or on the AR device 101 and, accordingly, is described merely by way of example with reference thereto. At operation 602, the AR device 101 receives or accesses thermal parameters for physical objects based on a context of the AR device 101 (e.g., location, task, operational status of the physical object, identification of the physical objects). An example of a thermal parameter for a machine or physical object includes a safe temperature range between t1 and t2 for a temperature sensor of an engine during steps 1 through 5 of a maintenance operation. In another example embodiment, the temperature ranges may be automatically populated based on historical temperature averages detected by other AR devices while the machine or physical object is operating at a normal level (as determined based on the machine's manufacturer's specifications). Operation 602 may be implemented with the thermal anomaly detection engine 216 of the AR device 101 or with the server AR application 504 of the server 110.

At operation 604, the AR device 101 generates sensor data (e.g., thermal sensor data) using the sensors 202. In one example embodiment, the AR device 101 communicates the sensor data to the server 110.

At operation 606, the thermal anomaly detection engine 216 of the AR device 101 identifies a thermal anomaly based on a comparison of the sensor data with the thermal parameters based on the context of the AR device 101 (e.g., location, user identification, task) and the context of the physical objects (e.g., valve A is at level 1, machine B is at level 2, machine C is non-operational). The context of the physical objects provides a snapshot of the interdependencies of physical objects within an environment. For example, it may be normal for a machine to reach 300 degrees Fahrenheit when a valve is open. The same machine should not reach more than 400 degrees Fahrenheit when the same valve is closed. Operation 606 may be implemented with the thermal anomaly detection engine 216 of the AR device 101 or with the server AR application 504 of the server 110.

At operation 608, the AR device 101 generates and displays a warning notification based on the detection of the thermal anomaly. For example, the AR device 101 identifies which component is overheating by displaying a virtual arrow or coloring the overheated part. The color is displayed as a layer on top of the physical object. Operation 608 may be implemented with the thermal anomaly detection engine 216 of the AR device 101.

Figure 7:
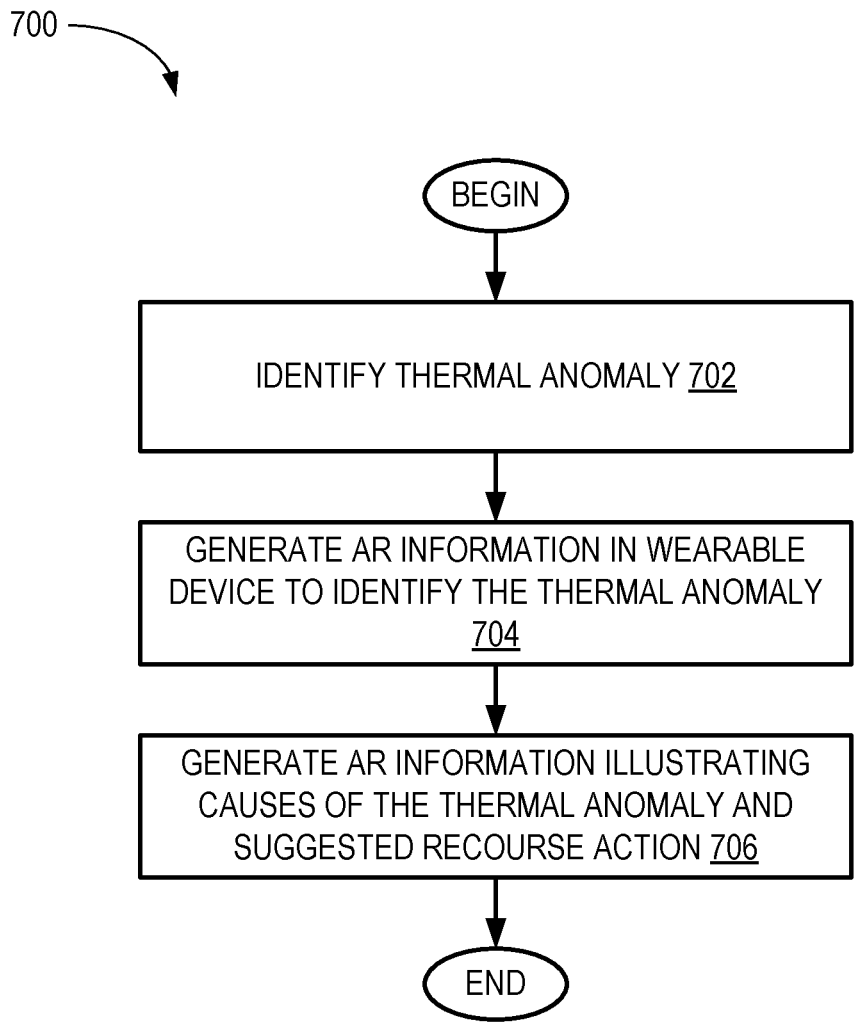
FIG. 7 is a flowchart illustrating a method for identifying thermal anomalies and generating warning notifications at a wearable device, according to another example embodiment.

FIG. 7 is a flowchart illustrating a method 700 for identifying thermal anomalies and generating warning notifications at a wearable device, according to another example embodiment. The method 700 may be deployed on the server 110 or on the AR device 101 and, accordingly, is described merely by way of example with reference thereto. At operation 702, the AR device 101 identifies a thermal anomaly using the method 600 of FIG. 6. At operation 704, the AR device 101 generates AR information that identifies the thermal anomaly. For example, a text or virtual arrow may point to the area or part of the environment with the thermal anomaly. At operation 706, the AR device 101 determines a suggested corrective action based on the context (e.g., machine A is overheating because valve B is open when it should be closed). The AR application 214 generates AR information visually identifying the cause of the thermal anomaly (e.g., coloring machine A), and shows how to remedy the thermal anomaly (e.g., virtual arrows floating above valve B indicate a direction in which the valve B should be turned to close the valve).

Figure 8:
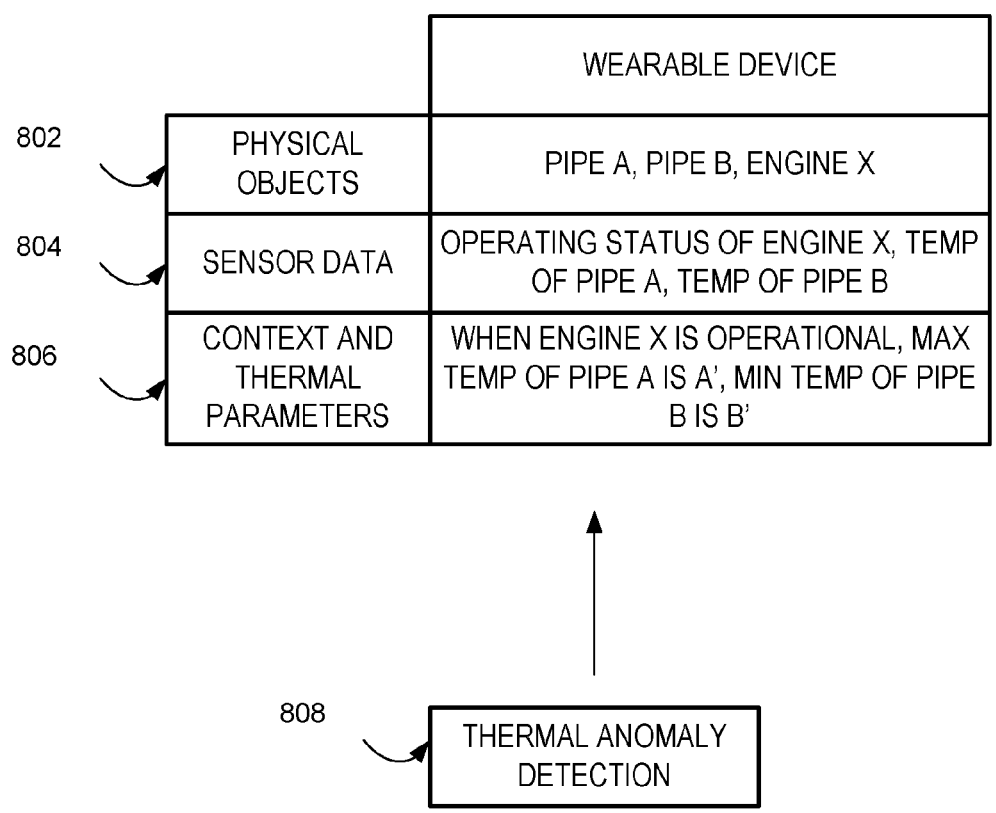
FIG. 8 is a block diagram illustrating an example of a thermal anomaly detection based on thermal parameters, according to an example embodiment.

FIG. 8 is a block diagram illustrating an example of a thermal anomaly detection based on thermal parameters and a context, according to an example embodiment. An AR device 101 detects physical objects 802 (e.g., pipe A, pipe B, engine X) in proximity to the AR device 101. The AR device 101 generates sensor data 804 (e.g., operating status of the engine X, temperature of pipe A, temperature of pipe B) for the detected physical objects 802. The AR device 101 identifies the context and corresponding thermal parameters 806 (e.g., when engine X is operational, the maximum temperature of pipe A is A', and the minimum temperature of pipe B is B'). A thermal anomaly detection 808 may be identified based on a comparison of the sensor data 804 with the context and thermal parameters 806.

Figure 9:
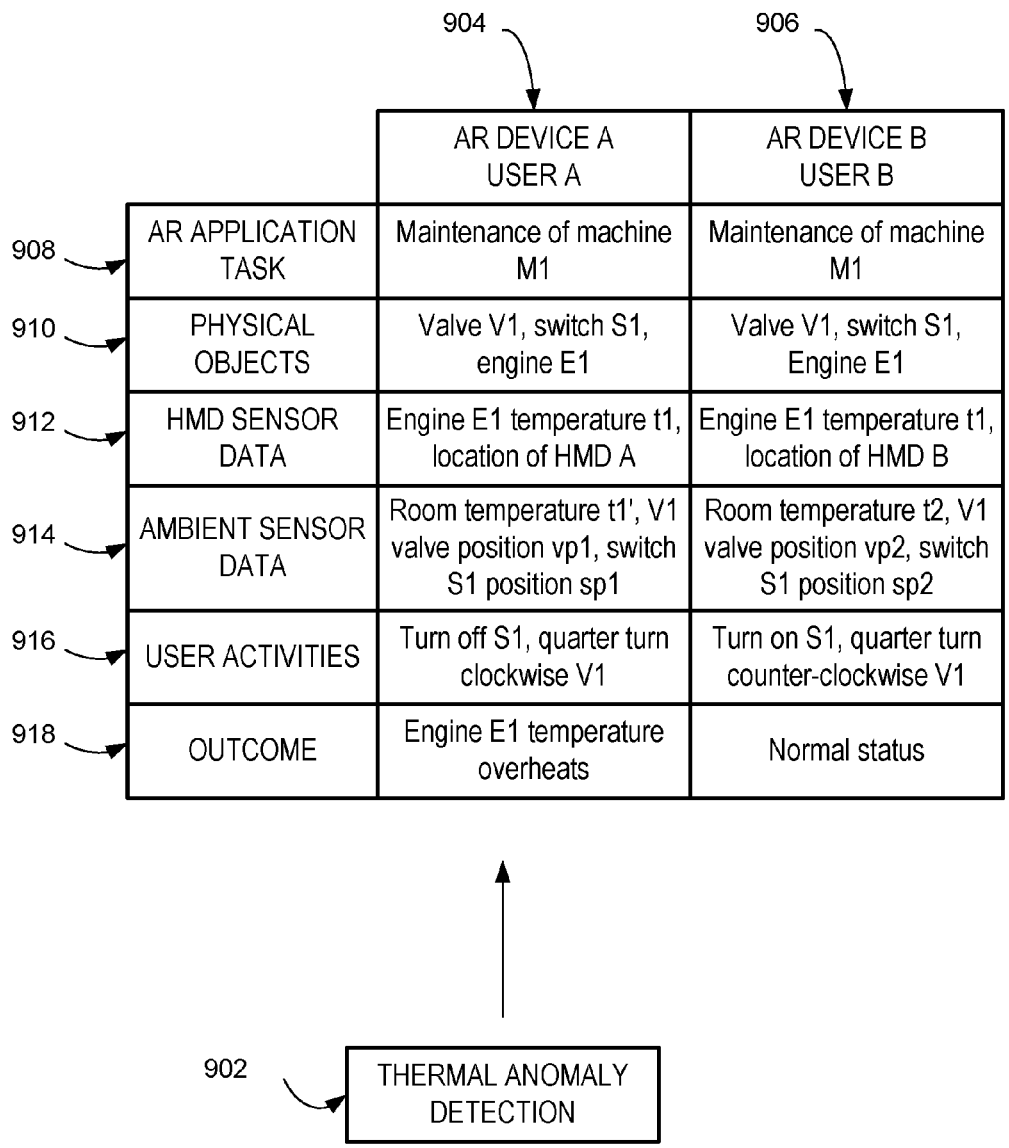
FIG. 9 is a block diagram illustrating another example of a thermal anomaly detection based on thermal parameters, according to an example embodiment.

FIG. 9 is a block diagram illustrating another example of a thermal anomaly detection 902 based on thermal parameters, according to an example embodiment. The AR device 101 determines a context based on the AR application task 908, physical object identified 910, AR device-based sensor data 912, ambient-based sensor data 914, user activities 916, and outcome 918. Each AR device/user 904, 906 generates their own context. The thermal anomaly detection 902 is based on a comparison of the contexts of each AR device/user 904, 906. In the present example, the context of the AR device/user 904 results in a negative outcome 918 (e.g., engine E1 temperature overheats).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor 212 or a group of processors 212) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 212 or other programmable processors 212) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 212 configured using software, the general-purpose processor 212 may be configured as respective different hardware modules at different times. Software may accordingly configure a processor 212, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors 212 that are temporarily configured (e.g., by software) or permanently configured to perform the relevant operations. Whether temporarily or permanently configured, such processors 212 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 212 or processor-implemented modules. The performance of certain of the operations may be distributed among the one or more processors 212, not only residing within a single machine, but deployed across a number of machines. In some example embodiments, the processor or processors 212 may be located in a single location (e.g., within a home environment, an office environment or as a server farm), while in other embodiments the processors 212 may be distributed across a number of locations.

The one or more processors 212 may also operate to support performance of the relevant operations in a "cloud computing" environment or as a "software as a service" (SaaS). For example, at least some of the operations may be performed by a group of computers (as examples of machines including processors 212), these operations being accessible via a network 108 and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 212, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network 108.

In example embodiments, operations may be performed by one or more programmable processors 212 executing a computer program to perform functions by operating on input data and generating output. Method operations can also be performed by, and apparatus of example embodiments may be implemented as, special purpose logic circuitry (e.g., a FPGA or an ASIC).

A computing system can include the AR device 101 and the server 110. The AR device 101 and the server 110 are generally remote from each other and typically interact through a communication network 108. The relationship of the AR device 101 and server 110 arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 212), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
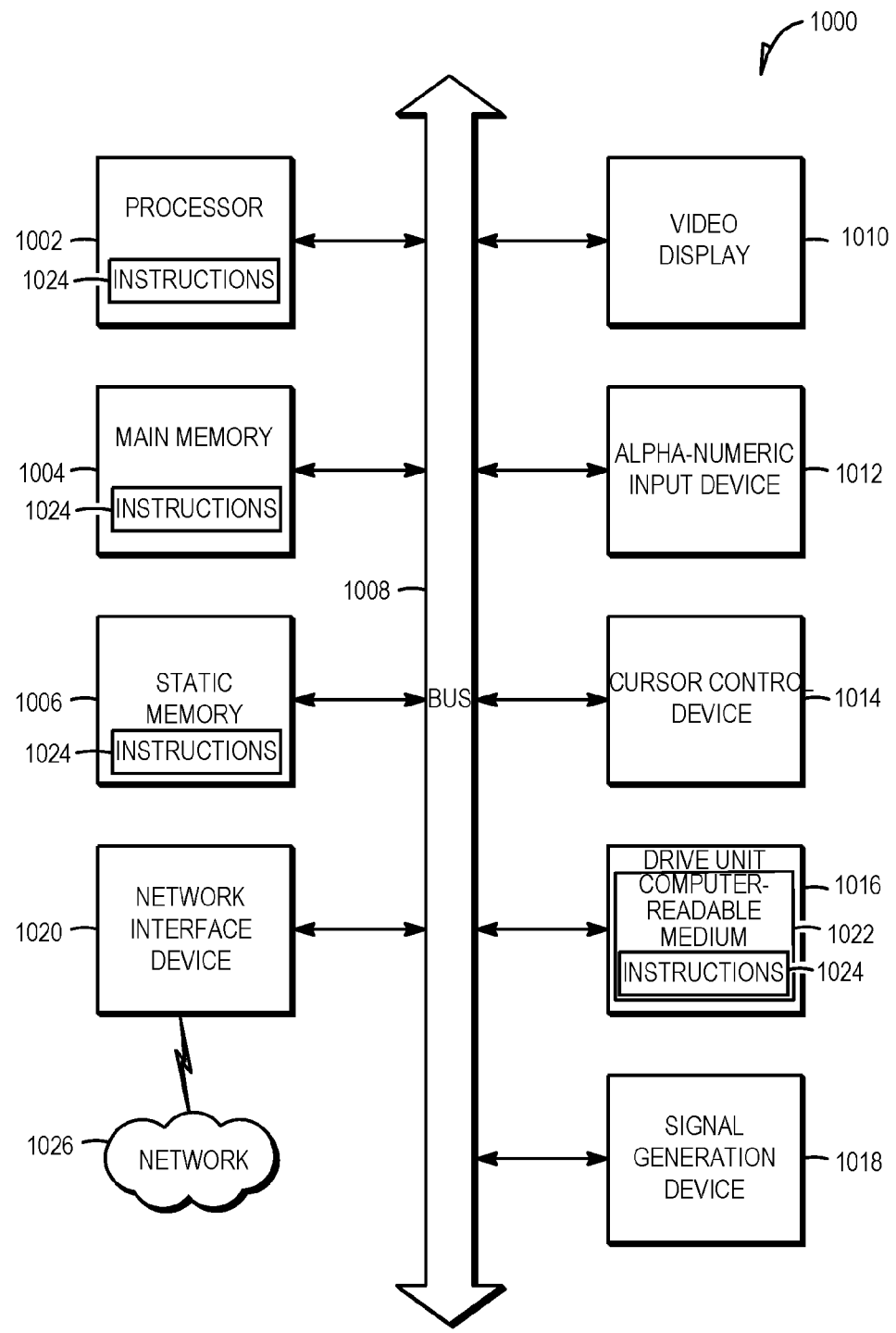
FIG. 10 is a block diagram illustrating components of a machine, according to some example embodiments, able to read instructions from a machine-readable medium and perform any one or more of the methodologies discussed herein.

FIG. 10 is a block diagram of a machine in the example form of a computer system 1000 within which instructions 1024 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server 110 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute a set (or multiple sets) of instructions 1024 to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a disk drive unit 1016, a signal generation device 1018 (e.g., a speaker) and a network interface device 1020.

Machine-Readable Medium

The disk drive unit 1016 includes a computer-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media 1022. The instructions 1024 may also reside, completely or at least partially, within the static memory 1006.

While the machine-readable medium 1022 is shown, in an example embodiment, to be a single medium, the term "machine-readable medium" may include a single medium or multiple media (e.g., a centralized or distributed database, and/or associated caches and servers 110) that store the one or more instructions 1024 or data structures. The term "machine-readable medium" shall also be taken to include any tangible medium that is capable of storing, encoding or carrying instructions 1024 for execution by the machine and that cause the machine to perform any one or more of the methodologies of the present embodiments, or that is capable of storing, encoding or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks 1026 include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practise the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The following enumerated embodiments describe various example embodiments of methods, machine-readable media, and systems (e.g., machines, devices, or other apparatus) discussed herein.

A first embodiment provides an augmented reality (AR) device comprising:

a transparent display;

a thermal sensor configured to generate thermal data related to physical objects detected by the AR device;

a processor comprising an augmented reality (AR) application and a thermal anomaly detection engine, the thermal anomaly detection engine configured to identify a thermal anomaly based on a context of the physical objects, the thermal data of the physical objects, and thermal parameters, and to generate a warning notification in response to the identified thermal anomaly, and the AR application configured to cause a display of AR content comprising identifying the physical object associated with the thermal anomaly in the transparent display.

A second embodiment provides the AR device according to the first embodiment, wherein the thermal anomaly detection engine comprises:

a thermal baseline identification module configured to map the physical objects in a three-dimensional space, identify normal operating thermal ranges, generate the thermal parameters based on the normal operating thermal ranges of the physical objects; and a thermal anomaly identification module configured to identify a physical object with a temperature exceeding the thermal parameters, and to generate correction information based on the context of the physical objects.

A third embodiment provides the AR device according to the second embodiment, wherein the context of the physical objects includes thermal ranges for each physical object based on an operating status of each physical object, the thermal ranges of one physical object dependent on the operating status of the other physical objects in the three-dimensional space.

A fourth embodiment provides the AR device according to the third embodiment, further comprising:

a depth sensor configured to map the physical objects in the three-dimensional space, wherein the thermal baseline identification module is configured to sample thermal data on the mapped physical objects after determining that the physical objects are operational, and to send the sample thermal data to a server.

A fifth embodiment provides the AR device according to the third embodiment, wherein the server is configured to receive a plurality of sample thermal data related to the three-dimensional space from a plurality of AR devices, to identify a context and operating status of the physical objects in the three-dimensional space, and to generate thermal parameters based on the plurality of sample thermal data, and the context and operating status of the physical objects.

A sixth embodiment provides the AR device according to the fifth embodiment, wherein the thermal baseline identification module is configured to receive the thermal parameters from the server.

A seventh embodiment provides the AR device according to the third embodiment, wherein the thermal anomaly identification module is configured to identify a part of the physical object with corresponding thermal data exceeding the thermal parameters for the context of the physical objects.

An eighth embodiment provides the AR device according to the second embodiment, wherein the AR content includes instructions to be displayed in the transparent display, the AR content comprising a three-dimensional model representing the instructions.

A ninth embodiment provides the AR device according to the second embodiment, wherein the thermal anomaly identification module is configured to identify a part of the physical objects causing the thermal anomaly based on the context, the AR content comprising instructions to repair the identified part of the physical objects.

A tenth embodiment provides the AR device according to the second embodiment, wherein the thermal anomaly identification module is configured to identify a part of the mapped space causing the thermal anomaly, the AR content comprising instructions related to the part of the mapped space.

What is claimed is:

1. An augmented reality (AR) device comprising:
a transparent display;
a thermal sensor configured to generate thermal data related to physical objects detected by the AR device;
a depth sensor configured to generate depth data of the physical objects and map the physical objects in a three-dimensional space based on the depth data;
a processor comprising an augmented reality (AR) application, a thermal anomaly detection engine, a thermal baseline identification module, and a thermal anomaly identification module,
the thermal anomaly detection engine configured to access a thermal baseline established based on a combination of depth data of the physical objects, thermal data of the physical objects in the mapped three-dimensional space, and thermal context of the physical objects based on their operating status and thermal parameters, to identify a thermal anomaly based on a context of the physical objects, the thermal data of the physical objects, and the established thermal baseline, and to generate a warning notification in response to the identified thermal anomaly,
the thermal baseline identification module configured to identify operating thermal ranges of the physical objects, and to generate the thermal parameters based on the operating thermal ranges of the physical objects,
the thermal anomaly identification module configured to identify a physical object with a temperature exceeding the thermal parameters, and to generate correction information based on the context of the physical objects, and
the AR application configured to cause a display of AR content comprising identifying the physical object associated with the thermal anomaly in the transparent display, and to display the correction information in the transparent display.

2. The AR device of claim 1, wherein the context of the physical objects includes thermal ranges for each physical object based on a combination of at least an operating status of each physical object, the thermal ranges of one physical object dependent on the operating status of the other physical objects in the three-dimensional space, and operating temperatures of other physical objects in contact with or nearby the physical objects.

3. The AR device of claim 2, wherein the thermal baseline identification module is configured to sample thermal data on the mapped physical objects after determining that the physical objects are operational, and to send the sample thermal data to a server.

4. The AR device of claim 3, wherein the server is configured to receive a plurality of sample thermal data related to the three-dimensional space from a plurality of AR devices, to identify a context and operating status of the physical objects in the three-dimensional space, and to generate thermal parameters based on the plurality of sample thermal data and the context and operating status of the physical objects.

5. The AR device of claim 4, wherein the thermal baseline identification module is configured to receive the thermal parameters from the server.

6. The AR device of claim 2, wherein the thermal anomaly identification module is configured to identify a part of the physical object with corresponding thermal data exceeding the thermal parameters for the context of the physical objects.

7. The AR device of claim 1, wherein the AR content includes instructions to be displayed in the transparent display, the AR content comprising a three-dimensional model representing the instructions.

8. The AR device of claim 1, wherein the thermal anomaly identification module is configured to identify a part of the physical objects causing the thermal anomaly based on the context, the AR content comprising instructions to repair the identified part of the physical objects.

9. The AR device of claim 1, wherein the thermal anomaly identification module is configured to identify a part of the mapped three-dimensional space causing the thermal anomaly, the AR content comprising instructions related to the part of the mapped space.

10. A method comprising:
determining thermal data related to physical objects detected by a thermal sensor of an Augmented Reality (AR) device;
generating depth data of the physical objects;
mapping the physical objects in a three-dimensional space based on the depth data;
accessing a thermal baseline established based on a combination of the depth data of the physical objects, the thermal data of the physical objects in the mapped three-dimensional space, and a thermal context of the physical objects based on operating status and thermal parameters;
identifying a thermal anomaly based on a context of the physical objects, the thermal data of the physical objects, and the thermal parameters;
identifying operating thermal ranges of the physical objects;
generating the thermal parameters based on the operating thermal ranges of the physical objects;
identifying a physical object with a temperature exceeding the thermal parameters;
generating a warning notification in response to the identified thermal anomaly;
generating correction information based on the context of the physical objects;

causing a display of AR content comprising the warning notification and an identification of the physical object associated with the thermal anomaly in a transparent display of the AR device; and displaying the correction information in the transparent display.

11. The method of claim 10, wherein the context of the physical objects includes thermal ranges for each physical object based on at least a combination of an operating status of each physical object, the thermal ranges of one physical object dependent on the operating status of the other physical objects in the three-dimensional space, and operating temperatures of other physical objects in contact with or nearby the physical objects.

12. The method of claim 11, further comprising:

sampling thermal data on the mapped physical objects after determining that the physical objects are operational; and sending the sample thermal data to a server.

13. The method of claim 12, wherein the server is configured to receive a plurality of sample thermal data related to the three-dimensional space from a plurality of AR devices, to identify the context and operating status of the physical objects in the three-dimensional space, and to generate the thermal parameters based on the plurality of sample thermal data and the context and operating status of the physical objects.

14. The method of claim 13, further comprising:

receiving the thermal parameters from the server.

15. The method of claim 11, further comprising:

identifying a part of the physical object with corresponding thermal data exceeding the thermal parameters for the context of the physical objects.

16. The method of claim 10, wherein the AR content includes instructions to be displayed in the transparent display, the AR content comprising a three-dimensional model representing the instructions.

17. The method of claim 10, further comprising:

identifying a part of the physical objects causing the thermal anomaly based on the context, the AR content comprising instructions to repair the identified part of the physical objects.

18. A non-transitory machine-readable medium comprising instructions that, when executed by one or more processors of an Augmented Reality (AR) device, cause the AR device to perform operations comprising:

generating thermal data related to physical objects detected by a thermal sensor of the AR device;

generating depth data of the physical objects;

mapping the physical objects in a three-dimensional space based on the depth data;

accessing a thermal baseline established based on a combination of the depth data of the physical objects, the thermal data of the physical objects in the mapped three-dimensional space, and a thermal context of the physical objects based on operating status and thermal parameters;

identifying a thermal anomaly based on a context of the physical objects, the thermal data of the physical objects, and the established thermal baseline;

identifying operating thermal ranges of the physical objects;

generating the thermal parameters based on the operating thermal ranges of the physical objects;

identifying a physical object with a temperature exceeding the thermal parameters;

generating a warning notification in response to the identified thermal anomaly; and generating correction information based on the context of the physical objects;

causing a display of AR content comprising the warning notification and an identification of the physical object associated with the thermal anomaly in a transparent display of the AR device; and displaying the correction information in the transparent display.

* * * * *